United States Patent [19]

Polyak et al.

[11] 4,134,482
[45] Jan. 16, 1979

[54] DEVICE TO EFFECT CONTROL OVER THE FRICTION CLUTCH OF A TRANSPORT VEHICLE

[75] Inventors: David G. Polyak; Evgeny I. Lebedev; Jury K. Esenovsky-Lashkov, all of Moscow; Boris N. Pyatko, Melitopol; Vladimir M. Mosyagin, Zaporozhie, all of U.S.S.R.

[73] Assignee: Tsentralny Nauchno-Issledovatelsky Avtomobilny I Avtomotorny Institut, Moscow, U.S.S.R.

[21] Appl. No.: 716,148

[22] Filed: Aug. 20, 1976

[51] Int. Cl.² ..................... F15B 13/10; F16D 43/284
[52] U.S. Cl. ................................. 192/91 R; 192/3.58; 192/103 FA
[58] Field of Search ......... 192/103 F, 103 FA, 104 F, 192/105 F, 91 R, .076, 3.58, 3.59

[56] References Cited

U.S. PATENT DOCUMENTS

| | | | |
|---|---|---|---|
| 2,609,905 | 9/1952 | Thomas | 192/91 R |
| 3,155,208 | 11/1964 | Biabaud | 192/103 FA X |
| 3,204,730 | 9/1965 | Alfieri et al. | 192/105 F X |
| 3,908,514 | 9/1975 | Rist | 192/91 R X |

Primary Examiner—Benjamin W. Wyche
Attorney, Agent, or Firm—Fleit & Jacobson

[57] ABSTRACT

A device comprising housing communicating with a pressure source and with the atmosphere through a traversable member operatively interconnected with the engine crankshaft, a link mounted in the housing interior traversably in response to pressure variation thereinside and operatively associated with the clutch actuator. Said link and said traversable member are interconnected through an elastic element. An embodiment of the device of the present invention can be used for transport vehicles with the friction clutches of any type.

4 Claims, 4 Drawing Figures

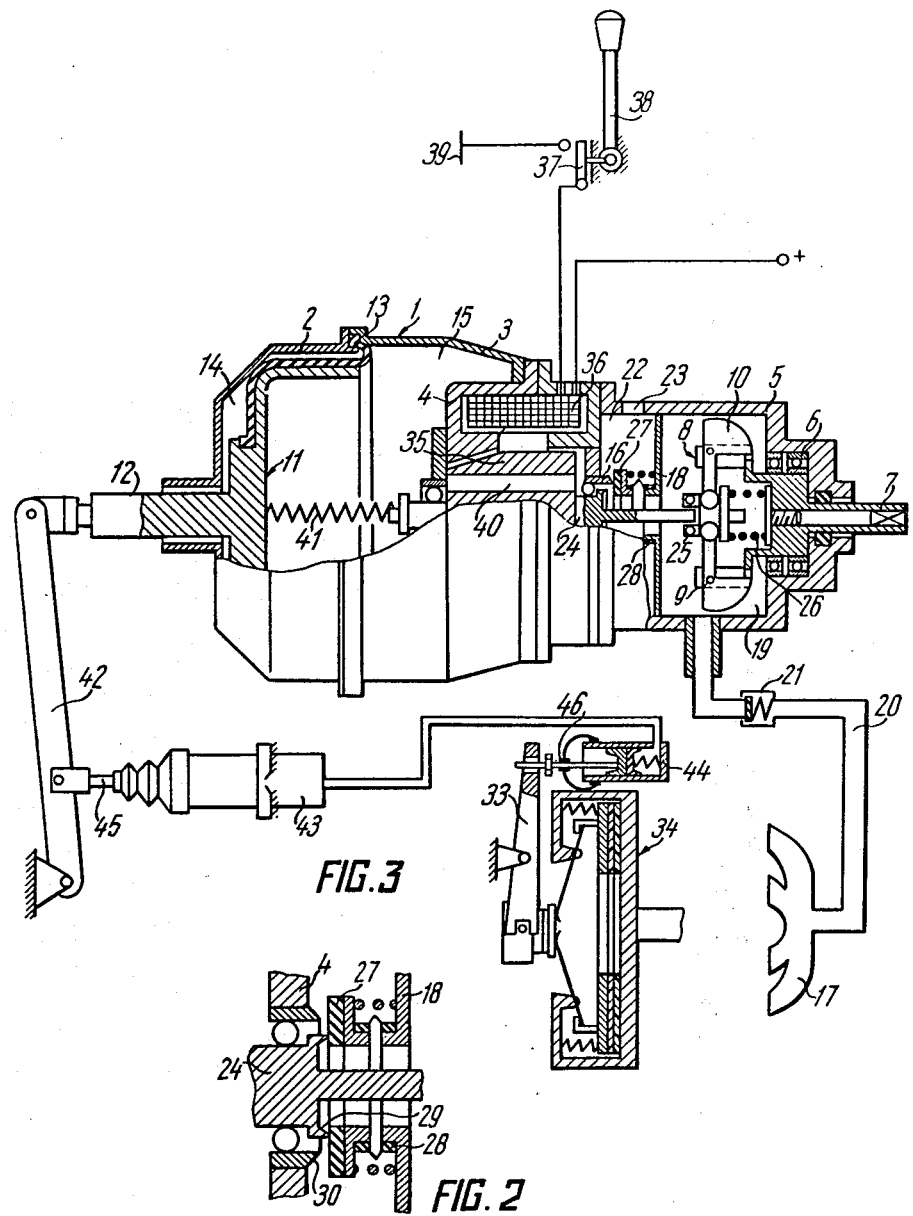

DEVICE TO EFFECT CONTROL OVER THE FRICTION CLUTCH OF A TRANSPORT VEHICLE

The present invention relates to transport vehicles and more particularly it relates to devices for controlling the friction clutches of transport vehicles.

The device provided according to the present invention is most expedient to be used in motor cars to control the friction clutches thereof.

Such devices are likewise quite practicable to use in lorries and buses.

Known in the art devices for controlling the friction clutches of transport vehicles, comprising a housing with an opening therein to communicate its interior with a source of pressure or with the atmosphere depending upon the signal from the engine crankshaft speed transmitter in the capacity of which a centrifugal speed governor is employed in the device under consideration, kinematically linked with the engine crankshaft. The member traversable in response to pressure variation within the clutch housing interior is operatively connected to the clutch actuator. For positively disengaging the clutch in the course of gear shifting, use is made in the described device of a magnet whose armature is adapted to actuate the traversable member, whereby the clutch housing interior is communicated with a pressure source.

The above-mentioned devices feature an automatic pressure control within the clutch housing interior in step with he engine crankshaft speed. Meanwhile, the relationship between the pressure effective within the clutch housing and the moment of friction between the clutch plates is broadly variable, being the function of the clutch design principles, the rate of the clutch pressure spring and the magnitude of the forces of friction in the clutch disengagement actuator. On this account some additional matching elements, such as springs in the clutch actuator, are made use of in certain cases to provide for a required relationship between the variation of the clutch moment of friction and the engine crankshaft speed in automatic control systems with centrifugal governors.

It is an object of the present invention to provide a device for controlling the friction clutch of a transport vehicle the design principle of which would make it possible to provide for a required relationship between the clutch moment of friction and the engine crankshaft speed regardless of the clutch construction.

It is another object of the present invention to simplify the construction of the aforesaid device.

It is one more object of the present invention to enable the device to be used in transport vehicles already in service.

According to said and other objects provision is made for a device to control the friction clutch of a transport vehicle, comprising a housing communicating with a pressure souce and with the atmosphere through a traversable member operatively inter-connected with the engine crankshaft, and a link mounted in the housing interior traversably in response to pressure variation thereinside and operatively associated with the clutch actuator, wherein according to the invention, said link and said traversable member are interconnected through an elastic element.

It is expedient to use a coil spring as said elastic element. Use of a coil spring is the simplest constructional arrangement and, besides, said spring is reliable in operation.

A device for controlling the friction clutch of a transport vehicle made according to the present invention, due to the provision of an elastic element between the traversable member and the link, is applicable in transport vehicles equipped with various types of friction clutches, including those provided with diaphragm springs. By virtue of this fact the field of application of such devices is extended which enables favourable conditions for increasing the program of their manufacture that will cut down production costs.

Given below is a detailed disclosure of a specific embodiment of the present invention with due reference to the accompanying drawings, wherein:

FIG. 2 shows the position of the valve when communicating the housing interior with the atmosphere;

FIG. 3 shows the device of FIG. 1 connected to the clutch actuator through a hydraulic drive.

Figure 1:
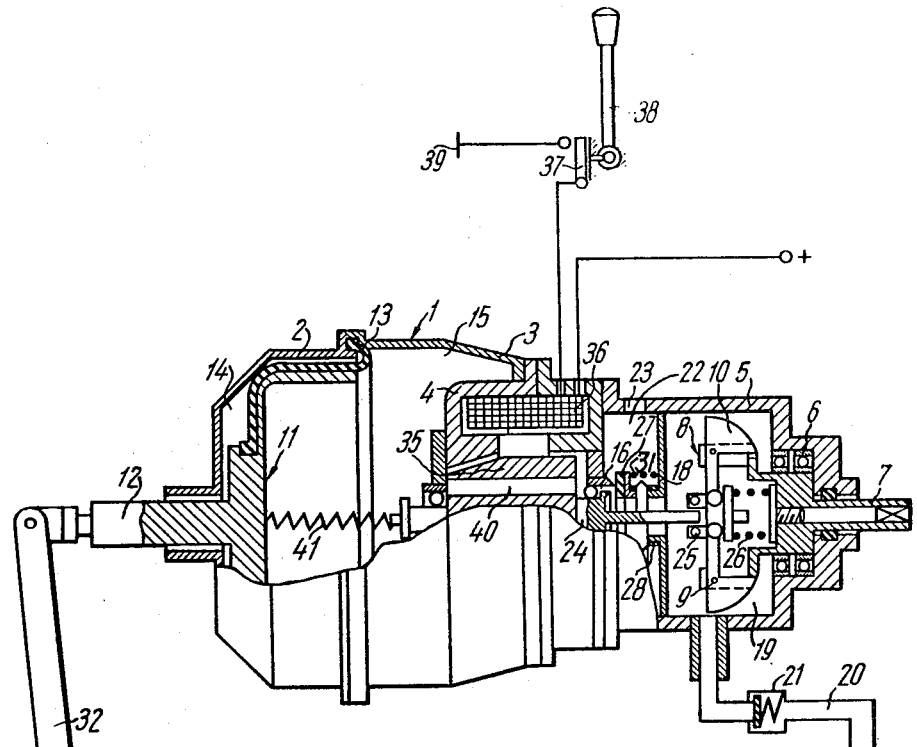
FIG. 1 is a schematic partially cutaway view of a device for controlling the friction clutch of a transport vehicle, according to the invention, position of the valve corresponds to communication of the housing interior with a pressure source.
Figure 4:
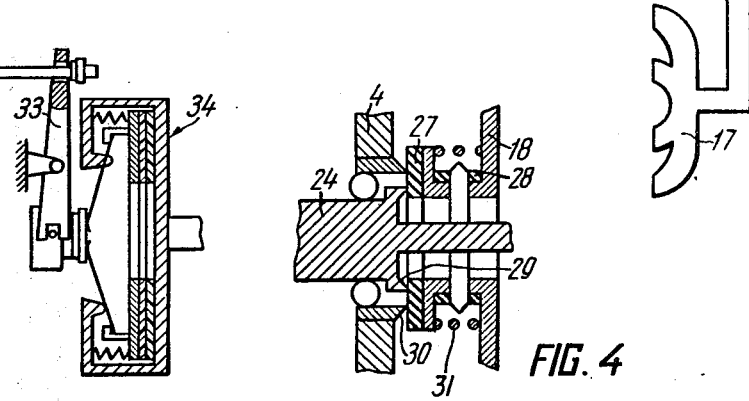
FIG. 4 shows the position of the valve when isolating the housing interior both from the source of pressure and from the atmosphere.

The device of the invention comprises a housing 1 (FIG. 1) built up by two pieces 2 and 3 that define the interior space of the housing 1. The latter accommodates a magnet 4 to which a cover 5 is attached, said cover mounting a shaft 7 of a centrifugal governor 8, said shaft running in bearings 6 and being kinematically associated with the engine crankshaft (not shown). Flyweights 10 are pivotally mounted on spindles 9 made fast on the shaft 7.

A link 11 accommodated in the interior of the housing 1 divides said interior space into two compartments 14 and 15, said link comprising a rod 12 and a diaphragm 13 connected thereto and held along its peripheral edge in between the pieces 2 and 3 of the housing 1. The compartment 14 is in permanent communication with the atmosphere, while the compartment 15 can be brought in communication through an opening 16 provided in the housing 1, with a pressure source 17, in the capacity of which the engine intake manifold is used. A partition 18 is provided in the cover 5 to separate out a chamber 19 communicating with the pressure source 17 through a pipe 20 provided with a check valve 21, from a chamber 22 communicating with the atmosphere through an outlet port 23 provided in the cover 5.

A traversable member 24 is accommodated in the compartment 15 of the housing 1, said member being adapted to interact with the flyweights 10 of the centrifugal governor 8 through a bearing 25.

A return spring 26 of the centrifugal governor 8 is fitted in between the shaft 7 and the flyweights 10 and is adapted to actuate the latter.

The chamber 22 of the cover 5 accommodates a valve 27 connected to a seal 28 which, in addition, is held to the partition 18.

The traversable member 24 has a seat 29 (FIG. 2) for the valve 27 to fit.

An outside seat 30 is provided along the periphery of the opening 16 in the housing 1, the valve 27 being forced thereagainst under the effect of a spring 31.

The rod 12 (FIG. 1) is interconnected through an arm 32 with an actuator 33 of a clutch 34.

The traversable member 24 is interconnected with an armature 35 of the magnet 4 adapted for positively disengaging the clutch 34. A coil 36 of the magnet 4 can be electrically connectd to either of the poles 39 of the power source (not shown) through a switch 37 conrolled from a gearshift lever 38. Port-ways 40 are provided in the armature 35 to communicate the compartment 15 with the chambers 19 and 22.

The rod 12 and the traversable member 24 are interconnected through an elastic element in the capacity of which use is made in the given particular case, of a coil spring 41, though the aforesaid connection may be attained due to the use of any other elastic members suitable for the purpose.

Interconnection of the rod 12 and the traversable member 24 through the elastic element (coil spring) 41 provides for a possibility to control the clutch engagement process in dependence with the amount of travel performed by the clutch actuating members, which defines much more accurately the degree of the clutch engagement as compared to the accuracy of control of pressure in the pneumatic actuator thereof, which is the case with the heretofore-known devices for controlling friction clutches. It is due to such a control of the clutch engagement process depending upon the amount of travel of the actuating members thereof that the herein-proposed device for friction clutch control is successfully applicable in transport vehicles equipped with any types of friction clutches.

An arm 42 (FIG. 3) interconnected with the rod 12, is practicable to be connected with the actuator 33 of the clutch 34 through hydraulically interconnected actuating cylinders 43 and 44. This is attained due to the arm 42 being articulated to a rod 45 of the actuating cylinder 43, and a rod 46 of the actuating cylinder 44 is interconnected with the actuator 33 of the clutch 34.

The device for controlling the friction clutch of a transport vehicles operates as follows.

When the engine crankshaft runs at low speeds at which the clutch 34 is to be disengaged, the centrifugal governor 8 develops an axial thrust much less than the tension of the return spring 26 thereof. On account of this fact the traversable member 24 is urged to move to the left (as seen in the drawing) by the tension of the return spring 26. As a result of such traverse the seat 29 of the traversable member 24 is released from the valve 27, whereby the latter gets forced against the outside seat 30 by virtue of the tension of the spring 31.

The aforesaid movements of the traversable member 24 and the valve 27 result in isolating the compartment 15 from the atmosphere and its communicating with the pressure source 17 through the port-ways 40 in the armature 35 of the magnet 4, the opening 16 in the housing 1, the chamber 19 of the cover 5, the check valve 21 and the pipe 20. The pressure effective in the compartment 15 being below the atmospheric, the link 11 is urged by such a differential pressure to travel to the right (as seen in the drawing). As the link 11 traverses to the right the spring 41 is being compressed, and the force tending to displace the traversable member 24 to the right is increased. As soon as the spring 41 becomes so compressed due to the movement of the link 11 as to develop such a force that, upon being summed up with the axial thrust produced by the centrifugal governor 8 and applied oppositely to the tension of the return spring 26, overcomes said tension, the traversable member 24 will move to the right.

The result is that the seat 29 presses the valve 27 and urges to displace it to the right. Once the seat 29 has got in contact with the valve 27, the compartment 15 is disconnected from the pressure sourse 17. At the same time, the compartment 15 becomes communicated with the atmosphere due to the valve 27 coming off the outside seat 30, the communication path being through the port-ways 40 in the armature 35 of the magnet 4, the opening 16 in the housing 1 and the outlet port 23 in the cover 5. This is followed by the air making its way into the compartment 15 to urge the link 11 to travel to the left. This travel results in a reduced force exerted by the spring 41 so that when said force together with the axial thrust developed by the centrifugal governor 8 becomes somewhat lower than the force of the return spring 26, the traversable member 24 will travel again to the left, thereby communicating the compartment 15 with the pressure source 17, and so on. Besides, a state of the system is possible where the valve 27 (FIG. 2) rests simultaneously upon the seats 29 and 30 of the traversable member 24 and the housing 1, respectively.

Performance characteristics of the centrifugal governor 8, the return spring 26 and the coil spring 41 are so matched that at a low engine crankshaft speed the force of the spring 41 together with the axial thrust exerted by the centrifugal governor 8 be equal to the force of the return spring 26 when the link 11 travels to the position corresponding to a complete disengagement of the clutch 34.

Thereby, a complete disengagement of the clutch 34 at low engine crankshaft speeds is attained. As the engine crankshaft speed increases, the axial thrust developed by the centrifugal governor 8 rises, too so as to get equal, together with the force of the spring 41, to the force of the return spring 26 at lower magnitudes of the force exerted by the spring 41.

On this account the link 11 moves to the left as the engine crankshaft speed rises, thus adding to the moment of friction developed by the clutch 34.

At a definite engine crankshaft speed the axial thrust developed by the centrifugal governor 8 so much relaxes the action of the return spring 26 upon the traversable member 24 that the latter proves to be displaced to the right under the effect of an initial loading of the spring 41 even when the link 11 assumes its leftmost position.

It is due to this fact that a complete engagement of the clutch 34 is ensured at a definite engine crankshaft speed.

Positive disengagement of the clutch in the course of gear-shifting process is achieved due to energizing the coil 36 of the magnet 4, which occurs by virtue of closing the contacts of the switch 37 when the driver throws the gear-shift lever 38 from one position to another. The coil 36 of the magnet 4 having been energized, the armature 35 of the magnet 4 travels together with the traversable member 24 interconnected therewith, to the leftmost position, whereby the compartment 15 gets communicated with the pressure source 17.

The pull force developed by the magnet 4 being in excess of the maximum tension force of the spring 41, the traversable member 24 remains in the leftmost position, source 17, wherein the compartment 15 keeps communicating with the pressure even after the link 11 has been assumed its rightmost position, wherein the spring 41 is compressed solid.

Thereby a complete disengagement of the clutch 34 is warranted, wherein any residual moment of friction therein (the so-called drag moment) is obviated.

An embodiment of the device as shown in FIG. 3 functions substantially in the same manner as discussed above, with the sole exception that the link 11 exerts upon the control actuator 33 of the clutch 34 through the actuating cylinders 43 and 44.

It is due to such an association of the device with the clutch actuation mechanism that the device can be located practically in any suitable place of a transport vehicle.

Pilot-run items of the device for controlling friction clutches have been installed on motor cars, have passed trial tests and ensured reliable engagement and disengagement of friction clutches and, likewise, an automatic control of the friction moment of the clutch depending on the engine crankshaft speed.

What we claim is:

1. A device to effect automatic control over the friction clutch of a transport vehicle, comprising: a housing whose interior space is adapted to communicate with a source of negative pressure and with the atmosphere; a traversable member movable between a first position in which the interior space of said housing communicates with the negative pressure source and a second position in which the interior space of said housing communicates with the atmosphere, said member being operatively connected at one end with a centrifugal governor in such manner that the movement of said member between said first and said second positions is controlled by movement of the centrifugal governor; a link mounted in the interior space of said housing traversable in response to the pressure variation in said interior space, said link being operatively interconnected with an actuator of said clutch in such manner that movement of said member by said centrifugal governor controls said actuator; and an elastic member interconnecting said link and the other end of the traversable member.

2. A device as claimed in claim 1, wherein a coil spring is used as the elastic member.

3. A device as claimed in claim 1, wherein said traversable member is movable into a third position in which the interior space of said housing is separated from both the pressure source and the atmosphere.

4. A device as claimed in claim 1, wherein said elastic member applies a force to said traversable member when the clutch is in the process of disengaging.

* * * * *